United States Patent
Zhou et al.

(10) Patent No.: US 11,802,167 B2
(45) Date of Patent: Oct. 31, 2023

(54) METHOD FOR PRODUCING COLD-WATER-SOLUBLE STARCH COMPRISING V-TYPE CRYSTALS

(71) Applicant: Jiangnan University, Wuxi (CN)

(72) Inventors: Xing Zhou, Wuxi (CN); Tingting Meng, Wuxi (CN); Zhengyu Jin, Wuxi (CN); Ren Wang, Wuxi (CN); Jianwei Zhao, Wuxi (CN); Jinpeng Wang, Wuxi (CN); Aiquan Jiao, Wuxi (CN); Xueming Xu, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 515 days.

(21) Appl. No.: 17/097,008

(22) Filed: Nov. 13, 2020

(65) Prior Publication Data

US 2021/0147581 A1    May 20, 2021

(30) Foreign Application Priority Data

Nov. 15, 2019   (CN) .......................... 201911119850.2

(51) Int. Cl.
| | |
|---|---|
| *C08B 30/14* | (2006.01) |
| *C08B 30/10* | (2006.01) |
| *C08B 30/06* | (2006.01) |
| *C08B 30/08* | (2006.01) |
| *C08L 3/02* | (2006.01) |

(52) U.S. Cl.
CPC .............. *C08B 30/14* (2013.01); *C08B 30/06* (2013.01); *C08B 30/08* (2013.01); *C08B 30/10* (2013.01); *C08L 3/02* (2013.01)

(58) Field of Classification Search
CPC ......... C08B 30/14; C08B 30/12; C08B 30/06; C08B 30/08; C08B 30/10; C08L 3/02
See application file for complete search history.

(56) References Cited

U.S. PATENT DOCUMENTS

| | | | | | |
|---|---|---|---|---|---|
| 4,634,596 | A | * | 1/1987 | Eastman | A23L 29/212 426/578 |
| 5,720,822 | A | * | 2/1998 | Jeffcoat | C08B 30/14 127/29 |
| 6,312,756 | B1 | * | 11/2001 | Dudacek | B29C 48/395 426/578 |
| 7,595,015 | B1 | * | 9/2009 | Wang | C09D 103/02 264/141 |
| 2001/0015138 | A1 | * | 8/2001 | Huber | A23P 10/40 99/353 |
| 2004/0140584 | A1 | * | 7/2004 | Wang | C08J 3/03 264/211 |
| 2019/0085155 | A1 | * | 3/2019 | Niles | B29C 48/40 |

* cited by examiner

*Primary Examiner* — Jeffrey M Wollschlager
(74) *Attorney, Agent, or Firm* — MATTHIAS SCHOLL P.C.; Matthias Scholl

(57) ABSTRACT

A method for producing a cold-water-soluble starch. The method includes: 1) adding a starch and 3-45 wt. % of an ethanol aqueous solution to a container, and stirring a mixture of the starch and the ethanol aqueous solution in the container, thus yielding a starch-ethanol-water; 2) introducing the starch-ethanol-water to an extruder and producing a noodle extrudate, where the extruder comprises 3 continuous temperature control areas: a first area having a temperature of 50° C., a second area having a temperature of between 95 and 120° C., and a third area having a temperature of 60° C.; a rotation speed of the extruder is 70-150 rpm; and the noodle extrudate has a diameter of 0.2-0.5 cm; 3) pressing and roll slitting the noodle extrudate, thus yielding a plurality of slices; and 4) drying the plurality of slices in a microwave vacuum oven, cooling, and pulverizing the plurality of slices.

3 Claims, 2 Drawing Sheets

METHOD FOR PRODUCING COLD-WATER-SOLUBLE STARCH COMPRISING V-TYPE CRYSTALS

CROSS-REFERENCE TO RELATED APPLICATIONS

Pursuant to 35 U.S.C. § 119 and the Paris Convention Treaty, this application claims foreign priority to Chinese Patent Application No. 201911119850.2 filed on Nov. 15, 2019, the contents of all of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to a method for producing a cold-water-soluble (CWS) starch comprising V-type crystals.

Cold water-soluble starch includes amorphous pregelatinized starch and V-type crystalline starch. Conventionally, the V-type crystalline starch is prepared by an alcohol-based production method or an alcohol-alkaline-based production method. The alcohol-based production method is performed under harsh conditions, for example, high temperature and high pressure, and the obtained starch requires washing repeatedly in alcohol. The alcohol-alkaline-based production method is mild compared with the alcohol-based production method, but involves a large amount of alkali, which requires to be neutralized with acids. This is not cost-effective and not environmental-friendly.

SUMMARY

The disclosure provides a method for producing a cold-water-soluble (CWS) starch comprising V-type crystals, the method comprising:
1) adding a starch and 3-45 wt. % of an ethanol aqueous solution to a container, and stirring or mixing a mixture of the starch and the ethanol aqueous solution in the container, thus yielding a starch-ethanol-water mixture, wherein a mass ratio of the starch to the ethanol aqueous solution in the container is between 1:0.3 and 1:1.1, and the starch-ethanol-water mixture has a mass concentration of 47-75%;
2) introducing the starch-ethanol-water mixture to an extruder and producing a noodle extrudate, wherein the extruder comprises 3 continuous temperature control areas: a first area having a temperature of 50° C., a second area having a temperature of between 95 and 120° C., and a third area having a temperature of 60° C.; a rotation speed of a screw of the extruder is 70-150 rpm; and the noodle extrudate is cylindrical and has a diameter of 0.2-0.5 cm and a length of 5-10 cm;
3) pressing and roll slitting the noodle extrudate, thus yielding a plurality of slices having a side length of 2-6 cm; and
4) drying the plurality of slices in a microwave vacuum oven, cooling, and pulverizing the plurality of slices cooled using an ultrafine pulverizer.

In a class of this embodiment, the starch is corn starch, cassava starch, potato starch, wheat starch, rice starch, or a mixture thereof.

In a class of this embodiment, in 4), the plurality of slices is dried at a temperature of 40-60° C. for 5-30 min, and a screen size of the ultrafine pulverizer is 0.3-1.0 mm.

DETAILED DESCRIPTION

To further illustrate, embodiments detailing a method for producing a cold-water-soluble (CWS) starch comprising V-type crystals are described below. It should be noted that the following embodiments are intended to describe and not to limit the disclosure.

Example 1

40 wt. % of an ethanol aqueous solution and corn starch were added to a container. The mass ratio of the corn starch to the ethanol aqueous solution in the container was 1:0.7. The resulting mixture was stirred and introduced to an extruder. The extruder comprised 3 continuous temperature control areas, that is, a first area having a temperature of 50° C., a second area having a temperature of 95° C., and a third area having a temperature of 60° C.; the rotation speed of the extruder was 150 rpm, whereby a noodle extrudate was obtained. The noodle extrudate was pressed and roll slit to yield a plurality of slices having a thickness of 0.1 cm and a side length of 5 cm. The plurality of slices was dried at 40° C. in a microwave vacuum oven for 30 min, cooled, and pulverized using a cyclone ultrafine pulverizer having a screen size of 1.0 mm, thus yielding a cold-water-soluble (CWS) starch comprising V-type crystals. The CWS starch was quickly dispersed in 25° C. water to form a paste, and had a cold paste viscosity of 5561 cP. Specifically, the cold paste viscosity of starch was measured by using a rheometer (Discovery HR-1, State of Delaware, America). 4.40 g (d. b) of the starch and 25 mL of distilled water were added to a sample cylinder, and the mixture was stirred up and down to disperse the sample for viscosity analysis. Test procedure: temperature was 25° C., and the speed of the stirrer was 160 rpm for 10 minutes. Record the viscosity.

Figure 1:
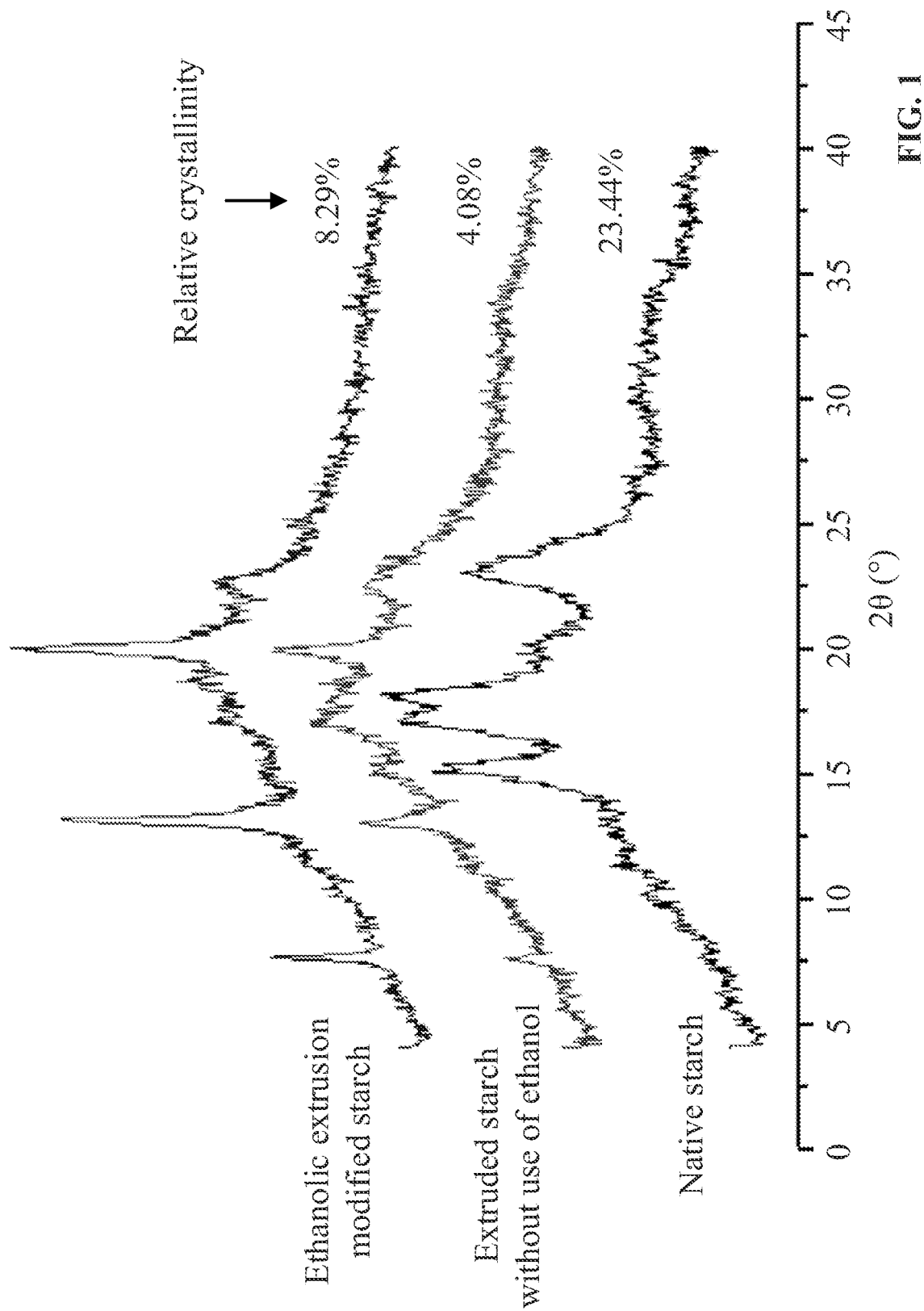
FIG. 1 shows a relative crystallinity and X-ray diffraction pattern of a cold-water-soluble (CWS) starch comprising V-type crystals prepared in Example 1, starch produced without the use of ethanol, and a native starch (corn starch)
Figure 2:
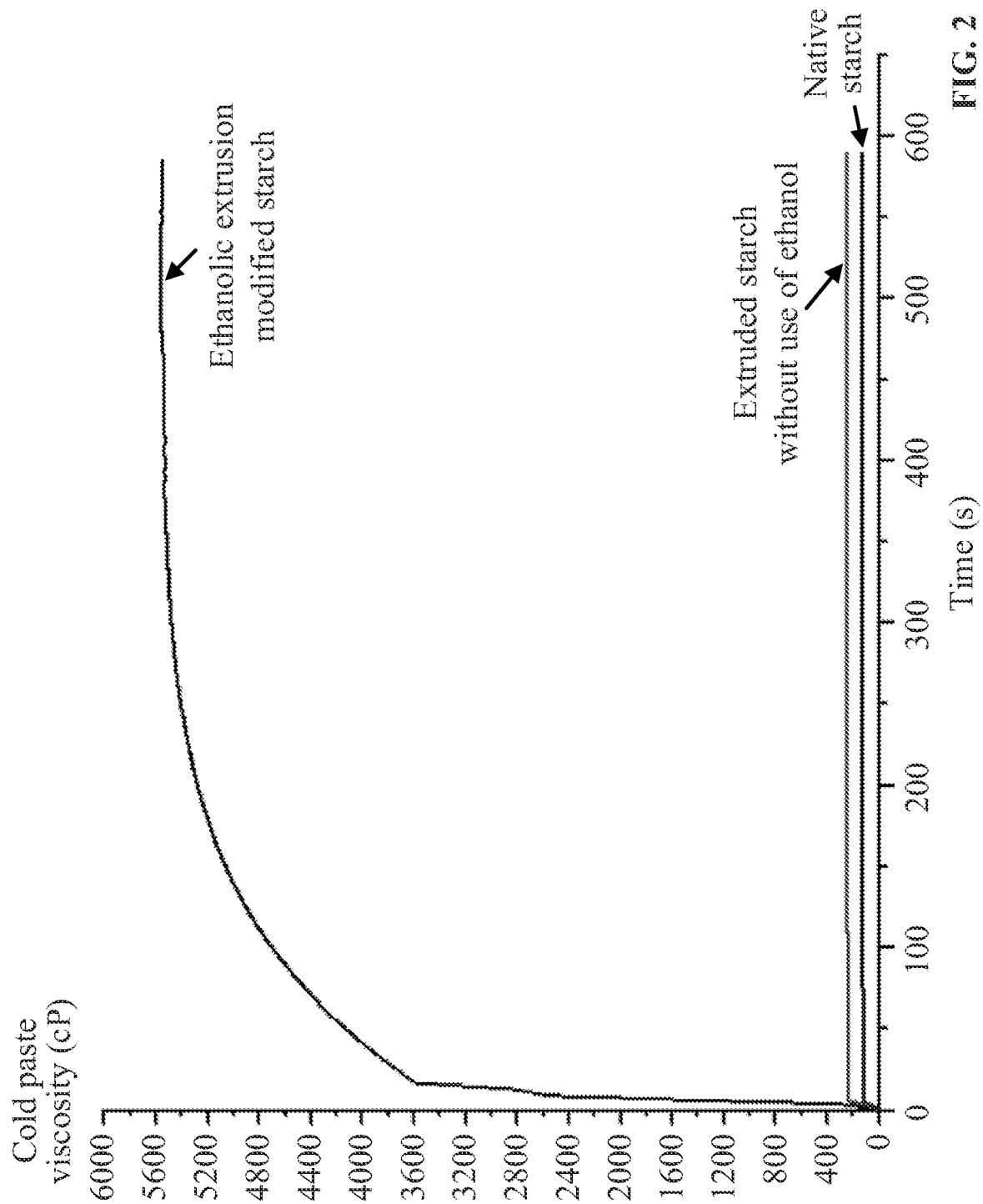
FIG. 2 shows a cold paste viscosity (CPV) of a cold-water-soluble (CWS) starch comprising V-type crystals prepared in Example 1, starch produced without the use of ethanol, and a native starch (corn starch).

The starch produced without the use of ethanol and the native starch had almost no cold paste viscosity (as shown in FIG. 2). X-ray diffraction analysis of the starch showed extruding the starch in the presence of ethanol changed the A-type structure of the original starch, exhibiting a typical V-type crystal structure, and the relative crystallinity was 8.29% (as shown in FIG. 1).

Example 2

3 wt. % of an ethanol aqueous solution and potato starch were added to a container. The mass ratio of the potato starch to the ethanol aqueous solution in the container was 1:1.1. The resulting mixture was stirred and introduced to an extruder. The extruder comprised 3 continuous temperature control areas, that is, a first area having a temperature of 50°

C., a second area having a temperature of 120° C., and a third area having a temperature of 60° C.; the rotation speed of the extruder was 70 rpm, whereby a noodle extrudate was obtained. The noodle extrudate was pressed and roll slit to yield a plurality of slices having a thickness of 0.1 cm and a side length of 5 cm. The plurality of slices was dried at 60° C. in a microwave vacuum oven for 5 min, cooled, and pulverized using a cyclone pulverizer having a screen size of 1.0 mm, thus yielding a cold-water-soluble (CWS) starch comprising V-type crystals. The CWS starch was quickly dispersed in 25° C. water to form a paste, and had a cold paste viscosity of 4876 cP. The relative crystallinity of the starch was 7.88%.

Example 3

80 wt. % of an ethanol aqueous solution, corn starch, and potato starch were added to a container. The mass ratio of the corn starch to the potato starch was 1:1. The mass ratio of the corn starch and the potato starch to the ethanol aqueous solution in the container was 1:0.3. The resulting mixture was stirred and introduced to an extruder. The extruder comprised 3 continuous temperature control areas, that is, a first area having a temperature of 50° C., a second area having a temperature of 70° C., and a third area having a temperature of 60° C.; the rotation speed of the extruder was 110 rpm, whereby a noodle extrudate was obtained. The noodle extrudate was pressed and roll slit to yield a plurality of slices having a thickness of 0.1 cm and a side length of 5 cm. The plurality of slices was dried at 50° C. in a microwave vacuum oven for 15 min, cooled, and pulverized using a cyclone pulverizer having a screen size of 1.0 mm, thus yielding a cold-water-soluble (CWS) starch comprising V-type crystals. The CWS starch was quickly dispersed in 25° C. water to form a paste, and had a cold paste viscosity of 5843 cP. The relative crystallinity of the starch was 8.67%.

Example 4

75 wt. % of an ethanol aqueous solution and cassava starch were added to a container. The mass ratio of the cassava starch to the ethanol aqueous solution in the container was 1:0.35. The resulting mixture was stirred and introduced to an extruder. The extruder comprised 3 continuous temperature control areas, that is, a first area having a temperature of 50° C., a second area having a temperature of 100° C., and a third area having a temperature of 60° C.; the rotation speed of the extruder was 145 rpm, whereby a noodle extrudate was obtained. The noodle extrudate was pressed and roll slit to yield a plurality of slices having a thickness of 0.1 cm and a side length of 5 cm. The plurality of slices was dried at 40° C. in a microwave vacuum oven for 30 min, cooled, and pulverized using a cyclone ultrafine pulverizer having a screen size of 1.0 mm, thus yielding a cold-water-soluble (CWS) starch comprising V-type crystals. The CWS starch was quickly dispersed in 25° C. water to form a paste, and had a cold paste viscosity of 5591 cP. The relative crystallinity of the starch was 8.25%.

Example 5

45 wt. % of an ethanol aqueous solution and wheat starch were added to a container. The mass ratio of the wheat starch to the ethanol aqueous solution in the container was 1:0.76. The resulting mixture was stirred and introduced to an extruder. The extruder comprised 3 continuous temperature control areas, that is, a first area having a temperature of 50° C., a second area having a temperature of 75° C., and a third area having a temperature of 60° C.; the rotation speed of the extruder was 120 rpm, whereby a noodle extrudate was obtained. The noodle extrudate was pressed and roll slit to yield a plurality of slices having a thickness of 0.1 cm and a side length of 5 cm. The plurality of slices was dried at 50° C. in a microwave vacuum oven for 15 min, cooled, and pulverized using a cyclone ultrafine pulverizer having a screen size of 1.0 mm, thus yielding a cold-water-soluble (CWS) starch comprising V-type crystals. The CWS starch was quickly dispersed in 25° C. water to form a paste, and had a cold paste viscosity of 5939 cP. The relative crystallinity of the starch was 8.67%.

Example 6

10 wt. % of an ethanol aqueous solution and potato starch were added to a container. The mass ratio of the potato starch to the ethanol aqueous solution in the container was 1:1. The resulting mixture was stirred and introduced to an extruder. The extruder comprised 3 continuous temperature control areas, that is, a first area having a temperature of 50° C., a second area having a temperature of 120° C., and a third area having a temperature of 60° C.; the rotation speed of the extruder was 75 rpm, whereby a noodle extrudate was obtained. The noodle extrudate was pressed and roll slit to yield a plurality of slices having a thickness of 0.1 cm and a side length of 5 cm. The plurality of slices was dried at 45° C. in a microwave vacuum oven for 15 min, cooled, and pulverized using a cyclone ultrafine pulverizer having a screen size of 1.0 mm, thus yielding a cold-water-soluble (CWS) starch comprising V-type crystals. The CWS starch was quickly dispersed in 25° C. water to form a paste, and had a cold paste viscosity of 5773 cP. The relative crystallinity of the starch was 8.55%.

The following advantages are associated with the method for producing a cold-water-soluble (CWS) starch comprising V-type crystals:

1. With regard to conventional pregelatinizing methods of starch such as drum drying and spray drying, the starch concentration cannot exceed 40 wt. %, and the water content is more than 60 wt. %; the method can treat the starch-ethanol-water with a mass concentration of 47-75%, thus reducing the energy consumption and production cost;
2. The extruder provides a variety of temperature conditions, so that the V-type crystals are formed in the starch in the presence of alcohol, and exhibit strong diffraction peak at 7°, 13° and 25° in the X-ray diffraction pattern of the starch (as shown in FIG. 1);
3. Compared with conventional pregelatinized starch produced without the use of alcohol, the cold-water-soluble (CWS) starch of the disclosure has much higher cold paste viscosity (as shown in FIG. 2);
4. The slices are dried in the microwave vacuum oven where an expansion effect is produced in the drying process, thus increasing the specific surface area and porosity of the slices;
5. The specific surface area and porosity of the V-type starch are further increased in the ultrafine pulverizer, thus improving the hydration capacity and cold paste viscosity of the starch; and
6. No water is produced and no extra chemical agent is involved in the method of the disclosure, so the method is environmentally friendly.

It will be obvious to those skilled in the art that changes and modifications may be made, and therefore, the aim in the appended claims is to cover all such changes and modifications.

What is claimed is:

1. A method, comprising:
   1) Adding a starch and 3-45 wt. % of an ethanol aqueous solution to a container, and stirring a mixture of the starch and the ethanol aqueous solution in the container, thus yielding a starch-ethanol-water, wherein a mass ratio of the starch to the ethanol aqueous solution in the container is between 1:0.3 and 1:1.1, and the starch-ethanol-water has a mass concentration of 47-75%;
   2) Introducing the starch-ethanol-water to an extruder and producing a noodle extrudate, wherein the extruder comprises 3 continuous temperature control areas: a first area having a temperature of 50° C., a second area having a temperature of between 95 and 120° C., and a third area having a temperature of 60° C.; a rotation speed of a screw of the extruder is 70-150 rpm; and the noodle extrudate is cylindrical and has a diameter of 0.2-0.5 cm and a length of 5-10 cm;
   3) Pressing and roll slitting the noodle extrudate, thus yielding a plurality of slices having a side length of 2-6 cm; and
   4) drying the plurality of slices in a microwave vacuum oven, cooling, and pulverizing the plurality of slices cooled using a pulverizer.

2. The method of claim 1, wherein the starch is corn starch, cassava starch, potato starch, wheat starch, rice starch, or a mixture thereof.

3. The method of claim 1, wherein in 4), the plurality of slices is dried at a temperature of 40-60° C. for 5-30 min, and the pulverizer is an ultrafine pulverizer having a screen size of 0.3-1.0 mm.

* * * * *